INVENTORS.
Francis C. Davis
Donald D. Cannon
Francis J. Furman, Jr.
John D. Sease

BY

ATTORNEY.

United States Patent Office 3,714,305
Patented Jan. 30, 1973

3,714,305
FABRICATION OF BONDED-PARTICLE NUCLEAR FUEL STICKS
Francis C. Davis, Oak Ridge, Donald D. Cannon, Powell, Francis J. Furman, Jr., Oak Ridge, and John D. Sease, Knoxville, Tenn., assignors to the United States of America as represented by the United States Atomic Energy Commission
Filed Mar. 10, 1971, Ser. No. 122,875
Int. Cl. C21c 21/04, 21/14
U.S. Cl. 264—.5     4 Claims

ABSTRACT OF THE DISCLOSURE

Fuel particles are vibratorily loaded into a given mold volume having a length and cross section corresponding to the final fuel stick dimensions. This compacted body of particles is moved past a bonding mixture injection zone through the coordinated movement of upper and lower rams, together with an internally applied pulsating pneumatic pressure to prevent further bed compaction, for the gradual impregnation of the particle bed with the bonding mixture. Solidification of the bonding mixture occurs very soon after injection so as to provide strength to the fuel sticks.

BACKGROUND OF THE INVENTION

This invention was made in the course of, or under, a contract with the United States Atomic Energy Commission.

A typical high-temperature gas-cooled reactor that utilizes ceramic fuel sticks is the Fort St. Vrain reactor designed by Gulf General Atomic for the Public Services Corporation of Colorado. That particular reactor has a graphite core containing approximately 210 fuel cavities per fuel element which are to be loaded with ceramic fuel sticks. Each cavity is about 30 inches long and 0.5 inch in diameter and preferably should contain, at the most, two 15-inch fuel sticks.

A typical prior method for the fabrication of fuel sticks involves the loading of a mold with fuel particles (carbon-coated $UO_2$, for example) and thereafter injecting from one end of the mold a carbonizable pitch mixture to infiltrate the particles. A significant amount of research has been performed in formulating a pitch mixture that can be fully injected into the particles and that will result in a binding medium having satisfactory characteristics under reactor operating conditions. Despite this research, which has substantially provided a pitch mixture of satisfactory characteristics under irradiation, fuel stick fabrication has been limited to sticks of about 2 inches in length due to the problem of getting proper infiltration of the pitch mixture into the body of the fuel particles. Thus, there exists a need for some means and a method of producing satisfactory fuel sticks having a length of at least 15 inches. The present invention was conceived to meet the need in a manner to be described hereinbelow.

SUMMARY OF THE INVENTION

It is the principal object of the present invention to provide a means and method for producing satisfactory bonded-particle nuclear fuel sticks having a length of at least 15 inches.

It is another object of the present invention to provide a means and method for fabrication of nuclear fuel sticks at a relatively high production rate.

It is also an object of the present invention to provide apparatus for such fuel stick fabrication which may be remotely operated.

The above objects have been accomplished in the present invention by providing means for loading a given mold volume corresponding to the desired fuel stick shape nuclear fuel particles, means for moving the entire bed with nuclear fuel particles means for moving the entire bed or column of fuel particles past a bonding mixture injection station, means for injecting the mixture into the continously moving and successive narrow bands of the fuel particles in the moving column, means for bonding the fuel particles to form a fuel stick, and means for solidifying the resulting fuel stick as it is removed from the apparatus.

DESCRIPTION OF THE PREFERRED EMBODIMENT

Figure 1:
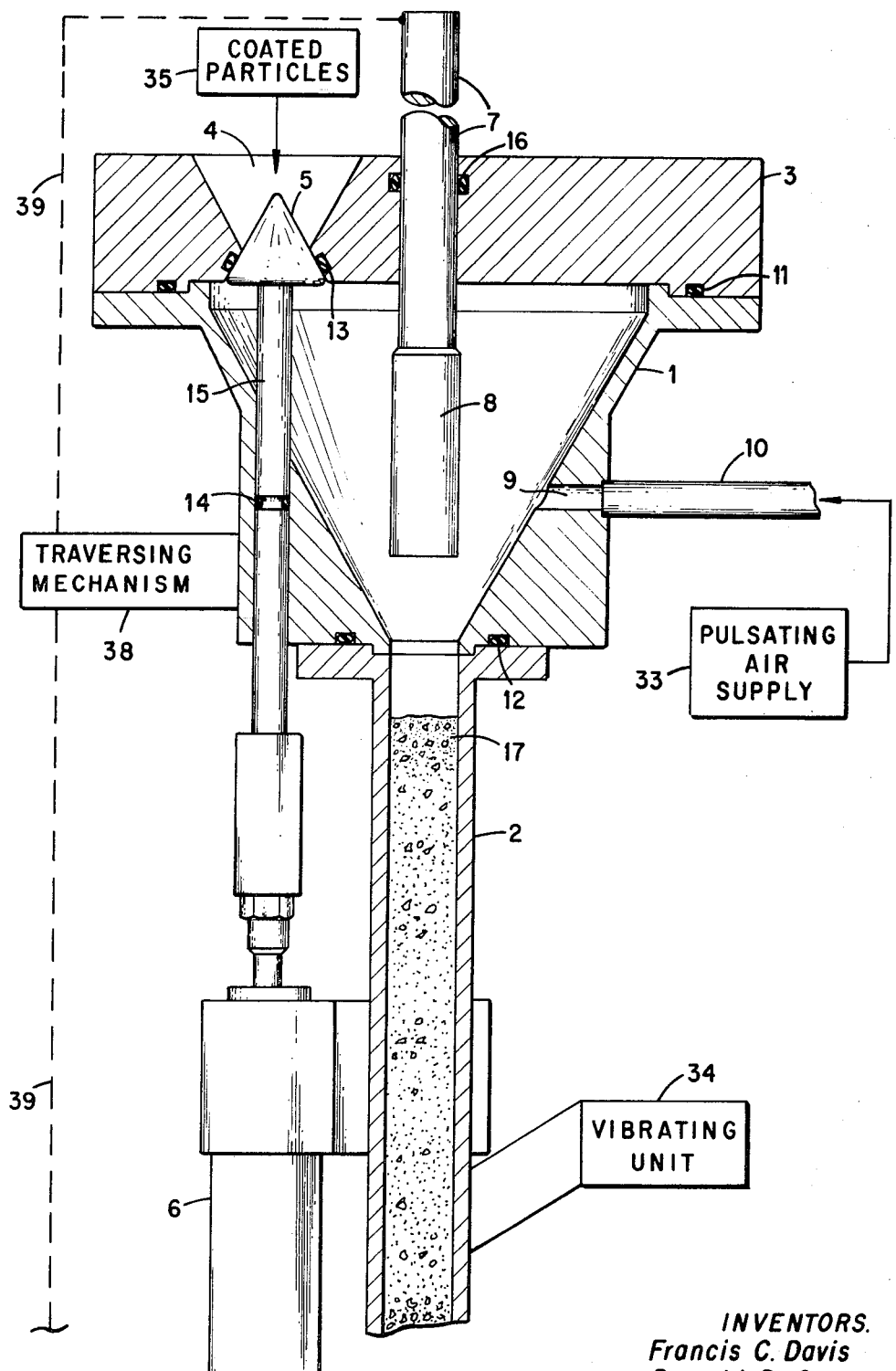
FIG. 1 is a cross-sectional view of the upper portion of the apparatus of the present invention to provide for the improved fabrication of nuclear fuel sticks.

Referring now to FIG. 1, the upper portion of the subject development is illustrated including the loading station. A conical hopper 1 is affixed to the top of a fuel stick forming cylinder (mold) 2. This hopper is provided with a cover 3 having a port 4 for the admission of fuel particles from a source 35. Port 4 may be closed by valve 5 which is raised or lowered by an operator (e.g., air cylinder) 6. An upper ram arm 7 penetrates the cover 3 and is axially aligned with the fuel cylinder 2. This arm 7 supports an upper ram head 8 having a diameter approximating, but slightly less than, the interior diameter of fuel cylinder 2. An air inlet port 9 is provided in the side wall of hopper 1 and is connected to air conduit 10 (the port 9 could be in cover 3, if desired), and the conduit 10 is connected to a pulsating air supply 33.

The hopper 1, cover 3, and cylinder 2 are releasably joined, as with bolts (not shown), and sealing therebetween is provided with resilient gaskets 11, 12. Resilient gaskets are also provided as a seal 13 for valve 5, as a seal 14 around valve stem 15, and as a ram arm seal 16 in cover 3. Fuel particles 17 are illustrated as nearly filling cylinder 2, as will be described in greater detail hereinafter.

Figure 2:
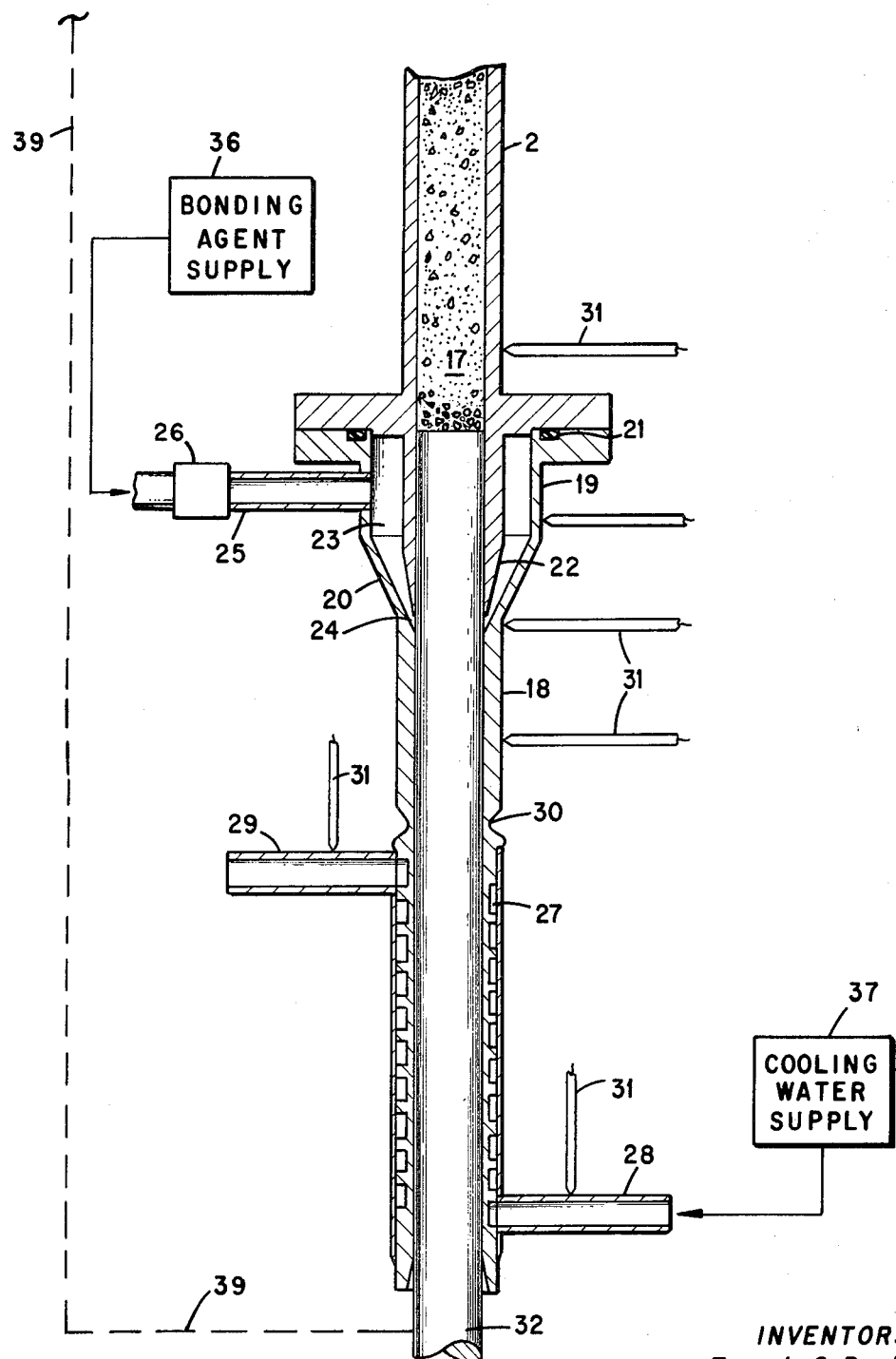
FIG. 2 is a cross-sectional view of the lower portion of this apparatus.

The lower portion of the apparatus of the subject development is shown in FIG. 2. A sleeve 18, having an enlarged upper portion 19 and a tapered transition portion 20, is releasably attached to the bottom of cylinder 2 and sealed thereto by a gasket 21. A lower extension 22 of cylinder 2 projects into the enlarged upper portion 19 of sleeve 18 so as to provide an annulus 23 which tapers into a jet 24 communicating with the interior of sleeve 18. A pitch inlet conduit 25, communicating with the annulus 23, is provided with a check valve 26, which is connected to a bonding agent supply 36.

Although not shown, the upper half of sleeve 18 and the lower portion of cylinder 2 are wrapped with heater cable to provide proper temperature for pitch impregnation. The lower portion of sleeve 18 is provided with a cooling channel 27 with coolant (water, for example) inlet conduit 28 and outlet conduit 29 communicating therewith. A reduced cross section 30 of sleeve 18 increases the temperature separation between the upper and lower portions of sleeve 18. Actual temperatures are derived from sensors, such as thermocouples 31. If a thermosetting bonding mixture is used, the heating and cooling zones would be reversed.

A lower ram 32 normally is positioned within sleeve 18 as shown. This ram supports the body of fuel particles 17 during the filling of cylinder 2 (position shown) and during subsequent movement and impregnation of the bed of fuel particles. When this lower ram is withdrawn from sleeve 18, an impregnated fuel stick can be removed from the apparatus.

Certain auxiliary devices are associated with the apparatus of FIGS. 1 and 2. For example, a vibrator unit 34 is attached to cylinder 2 so as to uniformly compact fuel particles within cylinder 2. In addition, means are provided to lower the upper ram 8 onto the upper surface of a bed of particles. Upper ram arm 7 and lower ram 32 may then be clamped to a traversing device or mechanism 38 by means of a mechanical coupling 39 which drives the upper ram 8 down through cylinder 2 at the same speed as the lower ram 32 is withdrawn from sleeve 18. Obviously, the supply of fuel particles 35, pitch mixture 36, water 37, and air 33 are required to feed the respective materials into the apparatus.

In a normal operation of the apparatus of FIGS. 1 and 2, fuel particles are added to the cylinder 2 through valve 5 into hopper 1. Ram 8 is withdrawn during the filling operation. Vibration of the cylinder 2 is continued during the loading to assure uniform close packing of the particles. These particles may be bare ceramic nuclear fuels or preferably are carbon-coated microspheres having central ceramic fuel kernels. When a fuel particle level is achieved as indicated in FIG. 1, the upper ram 8 is lowered to contact the upper level of the particle bed. The ram arm 7 is then clamped to the aforementioned traversing apparatus 38 so as to move the ram 8 down through cylinder 2 and thus move the bed of particles out of the bottom of the cylinder into sleeve 18 as the lower ram 32 is simultaneously withdrawn. During this downward movement of ram 8, pulsating high-pressure air (at a pressure greater than the pitch injection pressure) is admitted through port 9 to assist in bed movement by minimizing, or preventing, seizure of the bed against the cylinder inner wall. Thus, there is "slug flow" of the particle bed through the cylinder 2.

When lower ram 32 is withdrawn to the position of jet 24, a pitch mixture (see description below) is injected through annulus 23 and jet 24 to impregnate the bed of particles. This region of the apparatus is preheated to about 150–180° F. The theoretical minimum distance the pitch mixture must infiltrate the fuel particles is the radius of the fuel column. In actuality, some axial infiltration will occur. As the fuel column continues to move, a new contiguous segment is infiltrated and the previously infiltrated portion moves into the cooled region so as to solidify and cool the pitch mixture. The final fuel stick diameter is controlled by the bore of sleeve 18 in this cooling region. When the upper ram 8 reaches the pitch mixture jet 24, the flow of the mixture will be terminated, but the ram motion will continue to expel the bonded fuel stick from the apparatus.

A preferred pitch mixture for use with the apparatus described above is the same as already developed for fuel stick fabrication. This mixture comprises a coal tar pitch (Grade 15V, Allied Chemical Co.) containing 35 to 50 wt. percent graphite filler. Specific fillers are Poco graphite (isotropic graphite flour, Poco Graphite, Inc.), Thermax (spherical carbon black, R. T. Vanderbilt Co.), Santa Maria (graphite flour, Collier Carbon and Chemical Co.), Robinson (air-blown graphite flour, Carbon Products Div., Union Carbide Corp.), JOZ (graphite flour, Great Lakes Carbon Corp.), and Asbury (natural flake graphite, Asbury Graphite, Inc.). Very satisfactory results have already been demonstrated using the Poco graphite filler in the pitch, as well as with equal mixtures of the Poco graphite and Thermax carbon black.

The apparatus described above provides a device which readily lends itself to a relatively high production rate for the fabrication of bonded-particle nuclear fuel sticks of at least 15 inches in length. It should also be evident that the operation of the above apparatus can be remotely controlled if such is desired.

Thus, the advantages associated with the present invention are:

(1) The length of the fuel stick which may be molded is not a function of the distance the pitch mixture can be forced through the particles;

(2) The elimination of the tendency to have a short section at the top of each fuel stick that is void of fuel particles (which would cause fuel discontinuities in a fuel element); and (3) High production rates are provided even under remote control.

This invention has been described by way of illustration rather than by limitation and it should be apparent that it is equally applicable in fields other than those described.

What is claimed is:

1. An improved apparatus for the fabrication of bonded-particle nuclear fuel sticks comprising a source of nuclear fuel particles, a mold corresponding to the desired fuel stick shape, means for loading said mold with nuclear fuel particles from said source to form a fuel particle bed within said mold, a bonding mixture injection station, means for continuously moving said fuel particle bed out of said mold past said bonding mixture injection station while maintaining said desired shape, a source of fluid bonding mixture in communication with said injecton station, means for injecting said bonding mixture from said staton into successive narrow bands of said continuously moving fuel particle bed, and means for solidifying said bonding mixture while maintaining said desired shape to form a bonded-particle fuel stick, said mold comprising a first, upper, elongated, narrow, tubular member, said means for loading said mold with fuel particles comprises a conical hopper affixed to the upper end of said tubular member and communicating therewith, said hopper provided with a side air inlet line, and a cover plate affixed to said hopper, said cover plate being provided with a cone-shaped opening for admitting fuel particles from said source into said hopper, the lower portion of said cover opening provided with an air-operated valve for controlling the admission of said fuel particles into said hopper, said means for continuously moving said bed of particles past said bonding mixture injection station comprises a second, lower, elongated, narrow, tubular member provided with an enlarged upper portion, which portion is affixed to a flanged lower portion of said first tubular member, the lower end of said first tubular member extending past said flanged portion thereof and into said upper enlarged portion of said second tubular member to define an annulus therebetween and to define a jet opening between said annulus and the interior of said second tubular member and constituting said injection station, a lower ram arm extending through said second tubular member and past said jet opening and into the lower extension of said first tubular member in the vicinity of said flanged portion thereof during the loading of said first tubular member with said fuel particles, an upper ram arm extending through a second opening in said hopper cover plate and in axial alignment with the axis of said first tubular member and adapted to be lowered into contact with said fuel particle bed within the upper portion of said first tubular member after the loading thereof, a traversing apparatus, said lower ram arm and said upper ram arm when in contact with said filled first tubular member adapted to be affixed to said traversing apparatus, said traversing apparatus adapted to effect simultaneous movement of said ram arms unidirectionally to effect the movement of said bed of fuel particles continuously past said jet opening to effect the continuous injection of said bonding mixture from said annulus through said jet opening into said continuously moving bed of fuel particles, and a source of pulsating high-pressure air connected to said hopper air inlet line to effect efficient flow of said fuel particle bed during its movement through said first tubular member by said ram arms.

2. The apparatus set forth in claim 1, and further including a vibration unit attached to said first tubular member to effect uniform compaction of fuel particles therein during the loading thereof from said hopper.

3. The apparatus set forth in claim 2, wherein said means for solidifying said bonding mixture comprises a source of cooling fluid, a cooling channel encompassing the lower-half portion of said second tubular member, and means for connecting said cooling channel to said source of cooling fluid.

4. An improved method of fabricating bonded-particle fuel sticks comprising the steps of loading a molded corresponding to the desired fuel stick shape with fuel particles to form a fuel particle bed within said mold, vibrating said mold during the loading thereof to effect uniform compaction of the fuel particles therein, moving the entire bed of fuel particles past a bonding mixture injection station while maintaining said shape, injecting a bonding mixture into successive narrow bands of the fuel particle bed during movement thereof past said station, injecting pulsating high-pressure air into said loaded mold during said fuel bed moving step past said station to effect an efficient flow of said fuel particle bed to said bonding mixture injection station, and solidifying said bonding mixture to form a bonded-particle fuel stick.

References Cited

UNITED STATES PATENTS

| | | | |
|---|---|---|---|
| 3,549,509 | 12/1970 | Casaling | 264—128 X |
| 3,250,833 | 5/1966 | Wagner | 264—128 X |
| 3,515,577 | 6/1970 | Irwin | 118—405 X |
| 3,264,388 | 8/1966 | Roach | 264—332 X |
| 2,885,287 | 5/1959 | Larson | 264—0.5 |
| 2,289,787 | 7/1942 | Kaschke et al. | 264—323 X |
| 2,964,793 | 12/1960 | Blume, Jr. | 264—Dig. 58 |
| 3,284,372 | 11/1966 | Bailey | 264—0.5 X |
| 3,338,988 | 8/1967 | Accary et al. | 264—0.5 |

CARL D. QUARFORTH, Primary Examiner

R. S. GAITHER, Assistant Examiner

U.S. C. X.R.

118—405; 264—128, 211, 323; 425—94, 104, 106